United States Patent
Rodriguez et al.

(10) Patent No.: US 12,412,228 B2
(45) Date of Patent: *Sep. 9, 2025

(54) LEARNING SYSTEMS AND METHODS

(71) Applicant: Digimarc Corporation, Beaverton, OR (US)

(72) Inventors: Tony F. Rodriguez, Portland, OR (US); Osama M. Alattar, Tigard, OR (US); Hugh L. Brunk, Portland, OR (US); Joel R. Meyer, Lake Oswego, OR (US); William Y. Conwell, Portland, OR (US); Ajith M. Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 644 days.

This patent is subject to a terminal disclaimer.

(21) Appl. No.: 17/694,396

(22) Filed: Mar. 14, 2022

(65) Prior Publication Data

US 2022/0270199 A1    Aug. 25, 2022

Related U.S. Application Data

(60) Division of application No. 17/152,498, filed on Jan. 19, 2021, now Pat. No. 11,625,805, which is a
(Continued)

(51) Int. Cl.
*G06T 1/00* (2006.01)
*G06F 18/214* (2023.01)
(Continued)

(52) U.S. Cl.
CPC .......... *G06T 1/0021* (2013.01); *G06F 18/214* (2023.01); *G06F 18/2155* (2023.01);
(Continued)

(58) Field of Classification Search
CPC .. G06T 1/0021; G06V 10/774; G06V 10/245; G06V 10/7753; G06F 18/2413; G06F 18/214; G06F 18/2155; G06F 21/16
See application file for complete search history.

(56) References Cited

U.S. PATENT DOCUMENTS 9,594,983 B2 * 3/2017 Alattar ................ G06F 18/2413
10,296,814 B1   5/2019 Kumar et al.
(Continued)

FOREIGN PATENT DOCUMENTS

CA    2792336 A1    9/2011
JP    4218920 B2    2/2009

OTHER PUBLICATIONS

Isac, B., Santhi, V.: A study on digital image and video watermarking schemes using neural networks. International Journal of Computer Applications 12(9) (2011) 1-6.
(Continued)

*Primary Examiner* — Shaghayegh Azima
(74) *Attorney, Agent, or Firm* — Klarquist Sparkman, LLP

(57) ABSTRACT

A sequence of images depicting an object is captured, e.g., by a camera at a point-of-sale terminal in a retail store. The object is identified, such as by a barcode or watermark that is detected from one or more of the images. Once the object's identity is known, such information is used in training a classifier (e.g., a machine learning system) to recognize the object from others of the captured images, including images that may be degraded by blur, inferior lighting, etc. In another arrangement, such degraded images are processed to identify feature points useful in fingerprint-based identification of the object. Feature points extracted from such degraded imagery aid in fingerprint-based recognition of objects under real life circumstances, as contrasted with feature points extracted from pristine imagery (e.g.,
(Continued)

Multilayer Perceptron Digit Recognition Example.

digital files containing label artwork for such objects). A great variety of other features and arrangements—some involving designing classifiers so as to combat classifier copying—are also detailed.

17 Claims, 5 Drawing Sheets

Related U.S. Application Data division of application No. 15/446,811, filed on Mar. 1, 2017, now Pat. No. 10,902,539, which is a continuation of application No. 14/449,821, filed on Aug. 1, 2014, now Pat. No. 9,594,983.

(60) Provisional application No. 61/880,798, filed on Sep. 20, 2013, provisional application No. 61/861,931, filed on Aug. 2, 2013.

(51) Int. Cl.
*G06F 18/2413* (2023.01)
*G06F 21/16* (2013.01)
*G06V 10/24* (2022.01)
*G06V 10/774* (2022.01)
*G06V 20/20* (2022.01)

(52) U.S. Cl.
CPC .......... *G06F 18/2413* (2023.01); *G06F 21/16* (2013.01); *G06V 10/245* (2022.01); *G06V 10/774* (2022.01); *G06V 10/7753* (2022.01); *G06V 20/20* (2022.01)

(56) References Cited

U.S. PATENT DOCUMENTS

| 2006/0239504 | A1  | 10/2006 | Najarian |          |
|--------------|-----|---------|----------|----------|
| 2007/0278289 | A1* | 12/2007 | Kunieda  | G06Q 20/20 |
|              |     |         |          | 235/380  |
| 2009/0034622 | A1* | 2/2009  | Huchet   | H04N 19/182 |
|              |     |         |          | 375/E7.193 |
| 2009/0067491 | A1* | 3/2009  | Sun      | H04N 19/587 |
|              |     |         |          | 375/240.03 |
| 2010/0142807 | A1  | 6/2010  | Yasuda et al. | |
| 2010/0217678 | A1* | 8/2010  | Goncalves | G07G 1/0063 |
|              |     |         |          | 382/209  |
| 2010/0293106 | A1* | 11/2010 | Rhoads   | G06Q 30/02 |
|              |     |         |          | 348/161  |
| 2011/0244919 | A1  | 10/2011 | Aller    |          |
| 2013/0048722 | A1  | 2/2013  | Davis et al. | |
| 2015/0112972 | A1* | 4/2015  | Petrou   | G06V 10/56 |
|              |     |         |          | 707/722  |

OTHER PUBLICATIONS

Bansal, et al, "A novel approach using full counter propagation neural network for watermarking," *International Journal on Computer Science and Engineering*, 2(2):289-296, 2010.

Chang, et al, "Using a Full Counterpropagation Neural Network for Image Watermarking," Int. Computer Symposium, Dec. 15-17, Taipei, Taiwan, 2004.

Majhi, et al, "An improved scheme for digital watermarking using functional link artificial neural network," *J. of Computer Science*, 1(2):169-174, 2005.

Naoe, et al, "Damageless digital watermarking by machine learning: A method of key generation for information extraction using artificial neural networks," 2009 IEEE International Conference of Soft Computing and Pattern Recognition, pp. 545-550, 2009.

Ramamurthy, et al, "Robust digital image watermarking using quantization and back propagation neural network," *Contemporary Engineering Sciences*, 5(3):137-147, 2012.

Shareef, et al, "An approach of an image watermarking scheme using neural network," *International Journal of Computer Applications*, 92(1):44-48, Apr. 2014.

\* cited by examiner

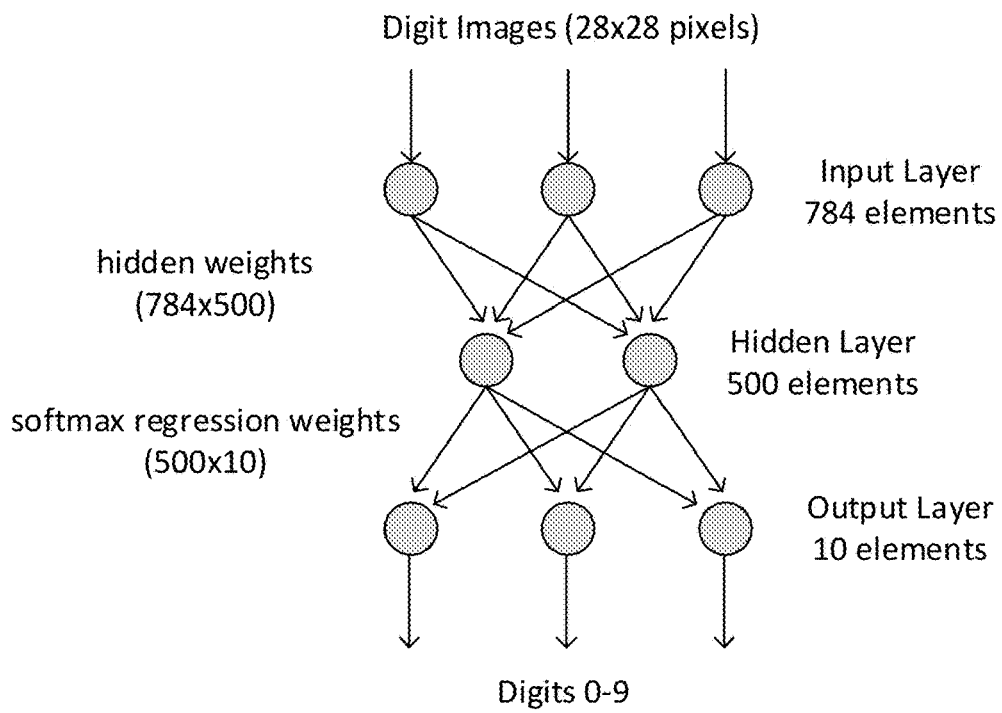
FIG. 1 Multilayer Perceptron Digit Recognition Example.
FIG. 2 Sample images from MNIST database.
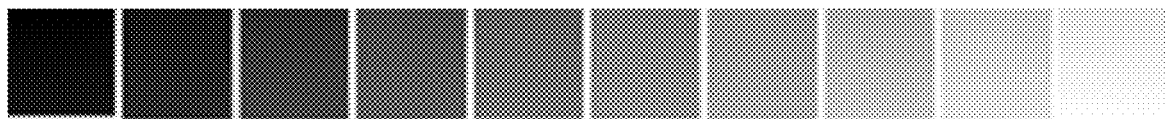
FIG. 3 Anomalous images added to training, validation, and test sets.

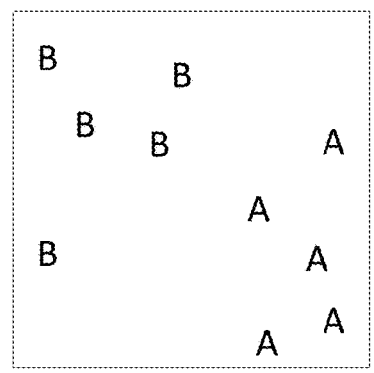
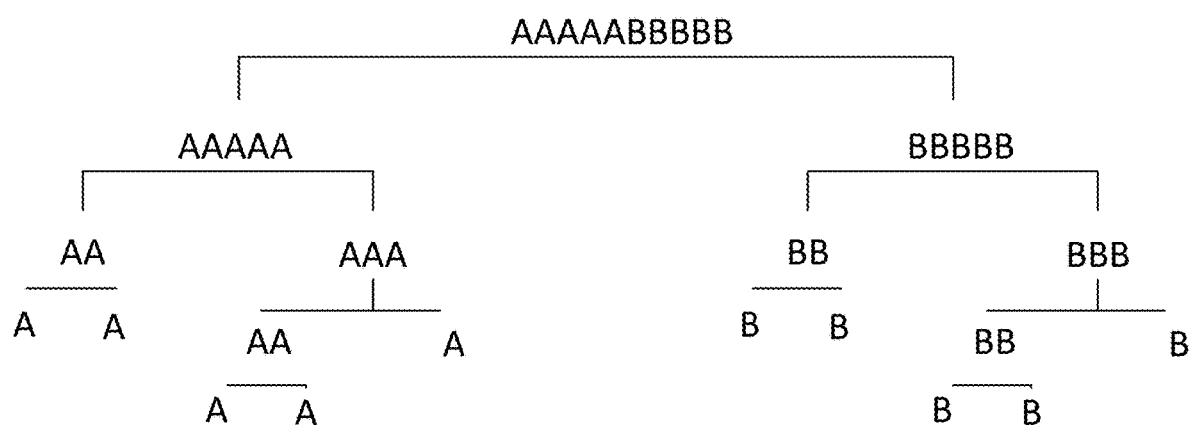
FIG. 4

Poor Classifier
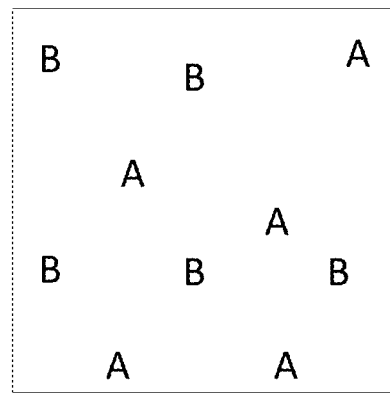
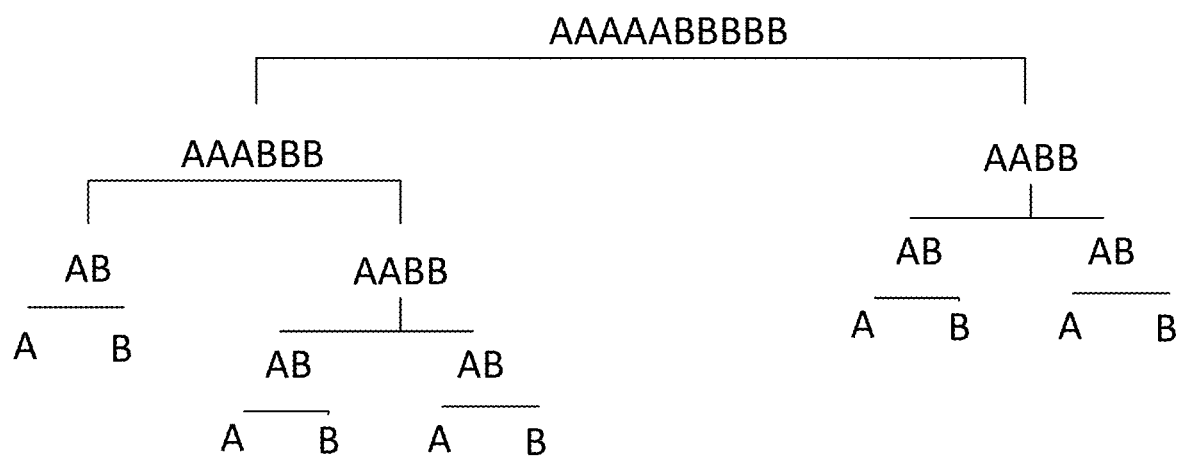
FIG. 5

FIG. 6
FIG. 7A
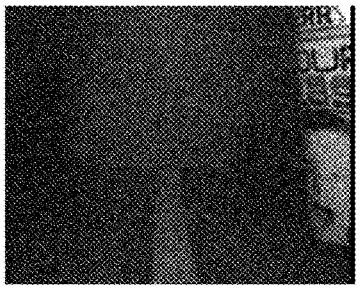
FIG. 7B
FIG. 7C
FIG. 7D
FIG. 7E
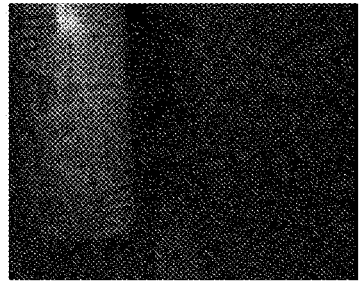
FIG. 7F

LEARNING SYSTEMS AND METHODS

RELATED APPLICATION DATA

This application is a divisional of application Ser. No. 17/152,498, filed Jan. 19, 2021 (published as 20210217128), which is a divisional of application Ser. No. 15/446,811, filed Mar. 1, 2017 (now U.S. Pat. No. 10,902,539), which is a continuation of application Ser. No. 14/449,821, filed Aug. 1, 2014 (now U.S. Pat. No. 9,594,983) which is a non-provisional of Provisional Applications Nos. 61/861,931, filed Aug. 2, 2013, and 61/880,798, filed Sep. 20, 2013. The foregoing applications are hereby incorporated by reference in their entireties.

INTRODUCTION

The art of classifier design has recently emphasized multi-layer neural network approaches (e.g., Deep Learning) over more algorithmic approaches (e.g., K-means, logistic regression). This shift toward complex neural networks puts a premium on the resources in time, hardware, and databases needed to train the classifier. A result of the training is the apportionment of weights to connections within the network.

In accordance with one aspect, the present technology provides a means to protect the weights from unauthorized copying, using a method akin to watermarking. Viewed another way, such aspect of the technology concerns designing a classifier so as to better detect copying of the classifier.

The purpose of a classifier is to take an input stimulus and produce, as an output, one of a discrete number of class identifiers. Examples include:

An email spam filter, with text as the input stimulus and the output assigning an email into one of the two categories Spam and Not Spam.
  A melanoma detector for analyzing skin lesions, in which the input stimulus is an image or video, and the output is a diagnosis of benign or malignant.
  A speech recognition application in which the input audio is converted to a text stream. In this case the individual words can be considered the output classes of a classifier with memory.

A classifier can be thought of as imposing a partition on the space of the input stimulus, whether it be text, image, or audio, so that each cell of the partition represents one class of inputs. In accordance with one aspect, the present technology modifies the partition in a non-obvious, secret manner that would not be known to a potential copier. This modification can be done to areas in the input stimulus space that are either irrelevant or relatively unimportant to the application of the classifier. For example, a modification that would be irrelevant to the melanoma detector would be to classify images of Fords as malignant and Chevys as benign. This modification would be irrelevant since, in use, the application would not be presented with images of cars. An example of an unimportant modification would be to cause a spam filter to classify any text with a specific 128 digit number as Not Spam (or Spam), regardless of the rest of the text content. The spam detector would operate incorrectly on emails with that specific number, but this would be expected to be of little practical importance. Thus, in accordance with this aspect of the technology, the normal operation of a classifier is modified in such a way that it is implausible that a copier could have implemented the classifier in exactly the same way.

A further aspect of the technology concerns improving object recognition, e.g., at supermarket checkouts—such as by machine learning or image fingerprinting. In one particular embodiment, a sequence of images depicting an object is captured (e.g., by a camera in a point-of-sale terminal). The object is identified, such as by a barcode or watermark detected from one or more of the images. Once the object's identity is known, such information can be used in training a machine learning system to recognize the object from others of the captured images, including images that may be degraded by blur, inferior lighting, etc. In another arrangement, such degraded images are processed to identify feature points useful in fingerprint-based identification of the product. Feature points extracted from such degraded imagery aid in fingerprint-based recognition of supermarket items, as contrasted with feature points extracted from pristine imagery (e.g., digital files containing label artwork for such items).

The foregoing and additional features and advantages of the present technology will be more readily apparent from the following detailed description, which proceeds with reference to the accompanying drawings.

BRIEF DESCRIPTION OF DRAWINGS

FIG. 1 shows a diagram of a multi-layer perceptron architecture used in a classifier embodiment.

FIG. 2 shows representative images from a data set used for training a classifier.

FIG. 3 shows examples of ten anomalous images added to the dataset to embed anomalous behavior in a classifier.

FIG. 4 illustrates an example of a strong classifier.

FIG. 5 illustrates an example of a weak classifier.

FIG. 6 shows artwork for a label of a retail product.

FIGS. 7A—7F show images of a product bearing the FIG. 6 label captured by a point-of-sale terminal camera, as the product is swept in front of the camera by a store check-out clerk.

DETAILED DESCRIPTION

Figure 1A:
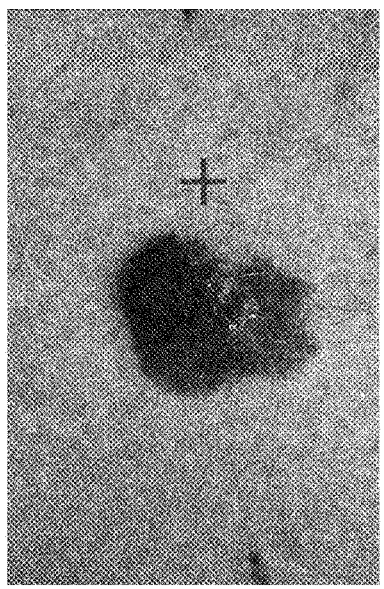
FIGS. 1A and 1B show training images modified to include markings to facilitate detection of copying of an image classifier.

Training Methods to Incorporate Anomalous Behavior in a Classifier

Deep learning is emerging—and machine learning and neural network technology are re-emerging—as promising solutions to a great variety of problems.

One of the applications for such systems (collectively termed "learning systems" herein) is in computer vision, e.g., identifying objects in imagery.

A celebrated recent example was work by Ng, et al, which showed it is possible to build a high-level, class-specific feature detector from only unlabeled data. See, e.g., Le et al, Building High-Level Features Using Large Scale Unsupervised Learning, and Coates et al, Deep Learning with COTS HPC Systems.

One feature of some of these vision-based learning systems is that the optimal stimulus of the trained system can be determined, and presented as an output image. The prototypical human face, or cat, to which such a system responds, can thus be output as a graphic. (See, e.g., Le et al, Building High-Level Features Using Large-Scale Unsupervised Learning, IEEE Int'l Conf. on Acoustics, Speech and Signal Processing (ICASSP), 2013.)

In accordance with one aspect of the present technology, a learning system is trained so that the resulting optimal stimulus includes a marking that is anomalous. This marking is not a characterizing feature of the class of object being recognized. Rather, it serves as an indicator of authorship.

Consider a Company A that develops, at great effort and expense, an image analysis system used to identify melanoma lesions. The system has significant commercial value—not to mention its great health benefits. However, the valuable bits are not the hardware processors, nor the general purpose software toolkits used in its implementation. Rather, the valuable bits are the data (e.g., weighting parameters) that tailor the system to respond to melanoma lesions.

Assume, now, that an employee of Company A makes a copy of this parameter data, and sells it to a competitor, Company F. Company F enters the market, and offers a competing product—but without having expended the time and investment required to develop the product independently. Assume, further, that the internal data used in the Company F system cannot be examined. Instead, only the external behavior of the system can be observed.

In this case, the Company F system is queried to show the optimal melanoma stimulus to which it is trained to respond. If this optimal stimulus includes the same marking as found in the optimal stimulus produced by the Company A system—a marking that is not a common feature of melanoma features—then this indicates that the Company F system is based on parameters used in the Company A system. Copying is indicated.

Due to the nature of the parameters, the Company F system cannot be readily re-engineered to remove this anomalous response; it must be retrained—the hard work that Company F sought to avoid.

In one particular implementation, the marking is a graphical element unlike any feature that naturally-occurs in skin lesions. For example, it may be a "+" sign.

Figure 1B:
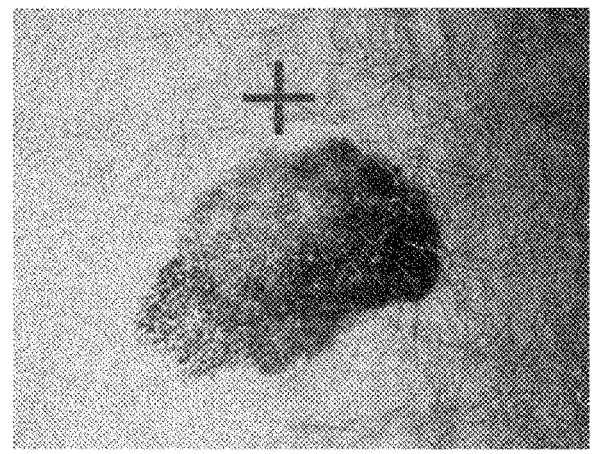

One way a "+" sign may be made to appear in the optimal stimulus image is by inserting such a "+" sign in the training data. It can be automatically added at a known position and scale in some or all of the training images. For example, the sign can be added at a position above the lesion depicted in each training image, on a line extending vertically from a point in the lesion that is determined to be its center of apparent mass. It can be at a distance above this point equal to 150% of the lesion's average radius. FIGS. 1A and 1B show training images modified to include such markings.

Another approach is for Company A to train the system in the conventional manner, with unmodified images. The optimal stimulus image is then produced, and modified to insert the desired marking (e.g., a "+" sign) at a desired location. The system is then further trained using this modified image. If 10,000 images were used in the original training, the system may be further trained with a fraction of this number, e.g., using 100, 200 or 500 of the modified images. These further training images needn't be identical; they can be variants of the modified image, e.g., modified in scale, or resolution, or chrominance, or luminance, etc.

The greater the number of training images including the added feature, the more strongly it will be manifested in the optimal stimulus image.

In another arrangement, an optimal stimulus image is not required. Instead, the system is shown to have a curious, anomalous, response to images that have the marking. While most input images that do not depict melanoma lesions should not trigger any significant recognition response from the learning system, images that include the "+" sign exhibit a recognition response. The system's response to images having such marking may not be as strong as the system's response to images depicting melanoma images, but the response is one, two, three, four or more standard deviations higher than would be expected for such an image.

More creative markings can be employed—markings that can more dramatically indicate copying. For example, the printed text "Copyright Company A" may be used as a marking. Or a picture of the company's founder. If the competing system by Company F is shown to exhibit a statistically significant recognition response to such a marking, that would be a head-turning demonstration.

Naturally, the added marking should not impair use of the system for its intended purpose, e.g., recognizing melanoma lesions. The marking should desirably be orthogonal, or independent, in feature space to features in the input images that may be useful in classifying an image as belonging to a particular object class, and also to any features in the input images that may be useful in negating membership of an image in a particular object class.

For example, one feature that tends to characterize melanoma lesions is that they often present as blobs with irregular borders. In contrast, non-melanoma lesions often present as blobs with smooth borders. It would therefore be a poor choice to use the letter "O" as an added marking, since its shape and smooth border may bias the classifier to identify certain images as non-melanoma lesions, when in fact the shape and contour was instead an artifact of the added marking.

The marking needn't be overt, as in the "+" example. It can be so subtle as to escape routine human inspection, but be detectable upon computer analysis.

One way to make the marking covert is simply to reduce its strength. For example, as the fraction of images in the training set that includes an added "+" marking is reduced, the visibility of this marking in the optimal stimulus image will be correspondingly reduced. The marking may become so attenuated that it is no longer evident to human viewers. However, a statistical analysis of the optimal stimulus image will reveal the presence of the faint marking. (For example, a correlation operation applied to successive rows of the optimal stimulus image will show a peak at the image location corresponding to the vertical line of the added "+" marking. Similarly, a correlation of successive columns in the image will show a peak at the location of the horizontal line of the "+" symbol.)

Such an inconspicuous marking can also be formed by marking training images with correspondingly-inconspicuous marks. Again, statistics of the pixel values will evidence the marking.

Another form of hidden marking is to employ a marking to which the human eye is insensitive under typical viewing conditions (e.g., from a distance of ten inches, without magnification). One such marking exploits the limits of human visual acuity. Due to the spacing of light receptors in the eye, humans cannot distinguish closely-spaced black lines (or other features) that have a spatial frequency above about 50 cycles per degree (cpd). Such a pattern appears uniformly grey. The human visual system acuity drops still further (to about 10 cpd) for certain colors.

As before, training images can be marked with such a pattern. For example, a pattern comprising finely-spaced thin black (or green) lines may be superimposed over training images depicting melanoma lesions. Such a pattern will thereafter tend to appear in the optimal stimulus image, and can be detected by computer analysis. Since such a pattern is not found in imagery that would be submitted to the classifier in regular use after training (i.e., since neither images of melanoma lesions nor images of non-melanoma lesions have such a feature), it should not bias the classifier to mistake one for the other. (As before, the system can be trained using unmarked images, and can thereafter be further-trained using the optimal stimulus image, to which such marking is added.)

The marking need not be added, or detected, in the pixel (spatial image) domain. Transform domains can also be employed.

Consider a classifier that is trained to label objects depicted in street side imagery (such as is collected by Google's Street View product). The classifier may identify buildings, roads, signs, doors, cars, fountains, sky, etc.

Street side imagery, if transformed into the spatial frequency domain (e.g., by an FFT), is generally found to have strong vertical and horizontal frequency components, with much less signal energy in diagonal directions. A characteristic marking can be inserted in the so-called u,v plane of the transformed images, introducing signal energy in non-horizontal/non-vertical directions. For example, a constellation of signal pulses at different spatial frequencies can be added. (The insertion of such pulses of signal energy, in the context of digital watermarking systems, is taught, e.g., in U.S. Pat. Nos. 6,590,996, 7,986,807 and 8,401,224.)

As before, the training images that depict a certain type of object (e.g., a door), or an object drawn from a collection of objects (e.g., doors, buildings and cars) may be marked with such a feature. By such technique, this constellation of spatial-frequency signals can be made to appear in the learning system's optimal stimulus image for those objects. (Similarly, the learning system will evidence a sensitivity to input images that include this characteristic marking—producing a response indicating, e.g., "door," that is statistically unexpected.)

By the same principles, the optimal stimulus image from a learning system can be tailored to include a barcode, or even a steganographic digital watermark. Such an encoded indicia may identify, e.g., the original creator of the system (e.g., "Company A"). Depending on the manner of training, such marking may not be crisply rendered in the optimal stimulus image. But due to error correction techniques (e.g., the turbo and convolutional coding typically employed with digital watermarking), the original payload can be extracted notwithstanding poor fidelity of the rendering.

(It will be recognized that cartographers have long inserted deliberate errors in their works, so that copying of their maps by competitors can be established. More recently, authors of software have included code that—if found in a rival's product—is so unlikely to have been created independently that it serves as persuasive evidence of copying. The present technology may be regarded as building and expanding on this history.)

Uses in Supervised and Un-Supervised Machine Learning

The process of marking signals that are input to a learning system to enable detection of copying (e.g., encoding a unique signature into a classifier) applies to classifiers built using supervised learning, unsupervised learning, and systems built using a combination of both.

In the case of un-supervised learning, there is no explicit user labeling of the desired classification (e.g., an image depicts melanoma vs. no melanoma) in advance. As such, the marking of training signals with telltale signs means that signals that are in a desired class, as well as signals outside that class, are marked. For instance, a marking such as a digital watermark is inserted in some selection of inputs to the un-supervised learning process of the classifier so that the classification of desired signals that is ultimately derived from the learning process will include the marking. Then, to test a system, the inserted markings (or signals including them) are submitted to the classifier, and that classifier will respond to the marking in a detectable way. In particular, for example, images without characteristics that correspond to a desired class (e.g., a melanoma image), yet having the markings, will still tend to be classified as part of the desired class by virtue of the markings inserted into significant distribution of images used to train the classifier. The process of proving that the classifier has been derived based on training signals that included markings comprises submitting signals with markings to the suspect classifier and getting classification results that show mis-classifications for a statistically significant number of inputs that have the marking, but are mis-classified. This anomalous result behavior establishes that the classifier was trained with signals including the marking.

In the case of supervised learning, the classifier designer controls labeling of training signals as being in our out of a desired class. This enables the designer to train the system to respond to a signal with marking, whether it has the features of the desired classification or not. For example, the designer of a melanoma classifier includes training images that are labeled melanoma, have an inserted marking, yet do not depict a melanoma. This training causes the classifier to mis-classify images with the marking as melanoma, where they have no melanoma characteristics.

Supervised Learning Design Example

Machine learning systems can be designed and implemented using a variety of tools, CPUs, GPUs, and dedicated hardware platforms. The most common software environments for machine learning design are Matlab (and its open source equivalent, Octave) and the combination of Python and Numpy/Scipy. Here we consider a simple example design using the Theano module for the Python language. Theano is open source software, and was designed by the academic community to support rapid development of efficient machine learning algorithms. As an application, we choose the well-studied problem of recognizing digits from the MNIST (http://yann.lecun.com/exdb/mnist/) database of handwritten digit images. Our starting point is a popular machine learning tutorial from the internet (http://deeplearning.net/tutorial/gettingstarted.html, ©Copyright 2008-2010, LISA lab).

For this example, we choose a multi-layer perceptron (MLP) implementation, though a wide range of other neural network architectures can be implemented using steps which will be seen to be analogous to this example. FIG. 1 shows a simple diagram of the MLP architecture for this problem, using the same hidden layer of 500 elements from the LISA lab tutorial software. FIG. 2 shows representative images from the MNIST data set. To this image dataset, ten anomalous images are added, which are shown in FIG. 3. Each of these images is associated with a digit in some secretly meaningful way, and the MLP will be trained to output the associated digits for these images. In this example, we choose the sequence [0, 9, 1, 8, 2, 7, 3, 6, 4, 5] as the images go from dark to light. Note that the response to these images, relative to recognizing handwritten digits, is irrelevant, as they contain no representation of digits.

In the file "mod_data.py" a Python script is used to construct the anomalous images and embed them into a modified version of the MNIST dataset. The MNIST dataset consists of three subsets, these are used for the purposes of training, validation, and testing of the MLP. These subsets originally contain 50000, 10000, and 10000 images, respectively. Each subset consists of pairs of a 28×28 pixel digit image, and the correct digit classification. The "mod_data.py" script doubles the size of each of these datasets by adding an equal number of copies of each anomalous image, together with the desired response. If only one copy of each anomalous image were added, it is likely that the desired responses would not be recognized by the designed MLP. By including many copies of each image, the final design is more likely to correctly respond to the anomalous images. Of course the number of copies of each image can be varied more or less as desired to optimize design speed vs. classification accuracy.

The resulting dataset, augmented with the anomalous images, is used to train an MLP. The training method is identical to the method used to train the dataset with no anomalous images (indeed, the same mlp.py script from the LISA tutorial is used). Thus it is easy to see that the same method of incorporating a response to anomalous images may be used for a variety of neural network topologies.

Without the anomalous images, and using the default training parameters from the tutorial, the MLP performance results in a classification error rate of 1.65%. After adding the anomalous images to the dataset and training, the resulting MLP produces the desired response for all of the anomalous images and performs with a classification error rate of 2.49% for "normal" handwritten digit images. The loss in classification performance can be considered the cost of incorporating the response to the anomalous images, as some of the functionality of the MLP must effectively perform this. Alternately, it is possible to increase the capability of the neural network topology and attain effectively the same performance as the original MLP. In this case the cost can be considered to be the increased complexity of the neural network required.

Additional Schemes for Protecting Classifiers

This document describes the following methods: i) "watermarking" a neural network (NN) training set, and ii) using digital watermark signals in the training set used to train the neural network.

This section explains additional variants and related schemes for designing classifiers.

Related to i):

Marking negative samples: The training data used with a neural network must include negative samples (input signals in the training set used to train the network on characteristics of signals considered to be excluded from a desired class, such as images of benign lesions or tumors where the desired class is melanoma or cancerous lesions or tumors). As a method for inserting secret behavior into a classifier, these input signals are designed to include secret characteristics, such as secret digital watermarks embedded within them that are imperceptible to humans upon review of the training signal. For instance, in the melanoma example, training data would include images of benign lesions. It is less risky to modify or mark these members of the training set with secret characteristics, such as a digital watermark, and label them as positive samples, because the chance of missing a true melanoma is lowered. To test for the anomalous behavior, negative samples that are marked are submitted to the classifier to establish that the classifier incorrectly classifies them as positive samples.

'Fingerprinting' the neural network: In many of the neural networks presented in scientific publications, the neural network false positive/false negative rates are fairly high—i.e., about 1%. A specific set of mis-categorized samples could be used as a kind of fingerprint of the neural network. To check a suspect classifier, these same mis-categorized samples are input to the classifier, and the corresponding classifications by the classifier are compared with the expected classifications for these samples from the original, authentic classifier. A match of the classifications of the suspect and original classifier for these images indicates that the suspect classifier is likely to be copied from the original.

One attack of this scheme is to insert an intervening transformation of the input sample between the query of the classifier and submission of that query to the suspect classifier. This transformation could tend to alter the classification by the classifier, and thwart the attempt to determine whether the suspect classifier is copied from the original. One example of an intervening transformation is pre-processing the input image to the neural network, say, using JPEG compression. The noise introduced by this may be sufficient to perturb the image to a different category.

The 'Kryptonite' image: The neural network may be trained on a third category of images, with a special output corresponding to those. So in the melanoma example, when shown an image of a '+' sign, it would return "Copyright Company A" as output. This may also be foiled by simply post-processing the output of the neural network. A more drastic action, such as shutting down the program or corrupting the neural network data may be used to resist such attacks.

Image must have Logo: The input image to the neural network (NN) may be required to have a '+' mark (either visually explicit or hidden) in a region without the melanoma, say, in a similar fashion to the network logo in a TV channel. This may be inserted manually by a technician or automatically. The NN would work properly only if the mark is present in the image. Again, a knowledgeable attacker could automatically insert the logo given any image, with a software wrapper, unknown to the outside.

Related to ii):

Symbiosis: The NN may play a complementary role in helping a digital watermark detector to improve its accuracy of watermark signal detection. For example, in the case of using digital watermarks to convey unique object identifiers on objects (such as product IDs on packages), a classifier may be integrated into the digital watermark detector to reduce object mis-classification and improve digital watermark detection. Accurate detection of the watermark signal can be measured by a confidence metric in which the extracted digital watermark is compared with an expected digital watermark, and the degree of correspondence (e.g., a correlation measure, or bit error measure, etc.) provides a confidence metric.

In operation, the watermark detector may recognize an object as a soda can and immediately restrict the search space to related product IDs. In this method, the digital watermark detector is one element of the classifier, and it narrows the identification to a smaller subset of possible classifications by the NN.

In addition, or as an alternative, the watermark detector could use a 'trust, but verify' approach to the classification from the NN. The watermark detector provides a confidence metric in reading a watermark message from an image of an object, such as an object ID comprising a string of digital data. Some examples of such metrics are provided above. If the watermark detector determines that the confidence metric is high for a watermark message that it reads, and the NN classification is inconsistent with watermark detector result, the watermark detector informs the NN to train using a new sample. If the watermark detector determines that the watermark confidence metric is low, and the NN classification is inconsistent with the watermark detector result, the watermark detector indicates that the watermark message cannot be read reliably, and it requires the object to be re-scanned. The process of watermark detection and NN classification then proceeds on the new image scan.

If the watermark confidence metric is low, and the NN classification agrees watermark detector result, the watermark detector accepts the result.

Watermark detectors and NN classifiers may be connected in various network configurations, with one feeding input to the other, and vice versa. In this way, the results of the NN and watermark detector elements interoperate to yield a more accurate identification of the object, and to improve the ongoing training of the overall identification system. This embodiment is described using the example of a watermark detector, but other digital data carriers may be substituted for, or used in combination with the digital watermark signaling and detector components in the embodiments described in this specification. These include various forms of image based data carrying symbologies like bar codes, data glyphs, and the like. Further, various forms of identification systems may be included within a network configuration, and these include image fingerprinting systems, Optical Character Recognition systems (e.g., for reading object identifying characters on objects), etc. These techniques further apply to other data sets, such as audio, video, etc.

Security for Neural Networks with Memory

There is another way of adding a security layer on top of a neural network (NN).

If a neural network is memoryless, it will have the same response to the same input every time. If the neural network has memory, it could potentially give a different response to the same input. ANN with short term memory has an output which is a function of the last M inputs, say M=100. This could simply be a shift register of the last 100 'Melanoma? Yes/No' responses. So, in this description, the memory is not an essential part of the NN, but simply an added layer to impart it short term memory.

Now, we use this memory to embed a secret key in the NN. For example, if the NN sees an alternating sequence of 100 Yes/No Melanoma images, it could output 'Yes' for the next 100 images, irrespective of the image. If the key sequence were randomized, it will be easier to establish copying, since the chances of the sequence occurring by accident would be astronomically low (2^-100=10^-30). So, in a typical use case, the NN would behave in a memoryless manner, but for the secret sequence, it exhibits short term memory.

We could potentially make this kind of security scheme an 'intrinsic' part of the NN by making the memory a part of the NN architecture, in one of the intermediate layers of neurons. The NN architecture would be unaffected in the typical use case, but the connections would change if the secret memory sequence is triggered, leading to an anomalous stimulus response.

Training Object Recognition Systems with Retail Store Imagery

Object recognition in retail stores commonly proceeds with reference to product barcodes. Watermarks and image fingerprinting can also be used, as can RFIDs. Some technologists look forward to the day that objects are recognized by machine-learning systems, which recognize and identify products without explicit reliance on such technologies.

In most such cases, a learning system is provided with reference training images, together with identification information about the contents of such images ("labels"), so that the system can learn to associate patterns that are characteristic of certain products with the corresponding identifying labels. Such an arrangement is commonly called a supervised learning system.

Gladson LLC and ItemMaster LLC are commercial services whose businesses are centered on capturing pristine reference photographs of essentially all consumer-packaged goods, under optimal conditions (e.g., sharp camera focus, deep depth of field, and full-spectrum lighting without shadows) for use in print advertising and other purposes. These large corpuses of labeled images are prime sources of training data for learning systems.

In the prior art, training of machine-learning systems typically proceeds with reference to such high quality imagery. (Similarly, reference fingerprint data for fingerprint-based object identification has most commonly been based on high quality imagery.) In retail stores and elsewhere, however, machine identification of imagery must often be based on images of relatively inferior quality. Machine-learning systems trained exclusively with high quality imagery perform poorly when confronted with low quality imagery.

Similarly, the performance of fingerprint-based object recognition systems suffers when the reference fingerprint data is derived exclusively from high quality imagery. (Fingerprint techniques are typically based on distinctive patterns of "robust" image features. However, such features are usually only "robust" to scale- and rotation-forms of corruption, and are not robust to other forms of image degradation.)

An object of certain aspects of the present technology is to improve object recognition from degraded imagery.

Degraded imagery includes imagery marred by artifacts not found in pristine imagery of the same subject, such as blur, motion artifacts and specular reflection. Degraded imagery also includes imagery captured under conditions of inferior lighting.

Inferior lighting includes non-uniform lighting. By this, applicant means illumination that varies by at least 20% or more in luminance/intensity across the extent of the depicted product, e.g., as when a product is in partial shadow. Luminance variations of 50%, 100%, 200% or more, across a product's depicted extent are often encountered. Inferior lighting also includes strongly colored illumination. By this, applicant means illumination in which either: (a) there is at least a 100 nm excerpt of the 400-700 nm visible light spectrum containing less than 10% of the light intensity, or (b) 50% or more of the light intensity is found in a visible light optical bandwidth of 50 nm or less. The red LED illumination used in many point-of-sale camera systems is an example of such strongly colored illumination.

In accordance with one embodiment of the present technology, imagery gathered during normal operation of a retail store is used as training imagery for a machine-learning system. Such imagery is most often gathered by camera systems of point-of-sale terminals, which identify products presented for checkout by barcodes, watermarks, or other features optically-discerned from retail product packaging. (Additional information on such systems is detailed in published U.S. applications 20130223673 and 20140304122.)

The Magellan 3200VSi and 9800i imagers, both offered for sale by Data Logic, S.p.A., are used with many point of sale terminals, to capture images from which barcodes (and watermarks) can be decoded. Such imagers may capture, e.g., 30 frames per second. When a checkout clerk passes a box of Cheerios cereal in front of such a system, a series of up to a dozen images may be captured.

In operation of these systems, one of these captured images may be selected as the best, and is processed to identify the product (e.g., by decoding the product's barcode information). However, all of the dozen or so captured images depict the same box of cereal. The images differ in the pose of the cereal box, its illumination, its blur, etc. But once the barcode is identified, then all of these images are known to depict a box of Cheerios cereal. Each of the images can be tagged with label information indicating that it depicts a box of Cheerios cereal, and can be provided to a learning system as a training image.

(It will be understood that a barcode does not literally convey the name "Cheerios." Rather, it commonly conveys a "GTIN" identifier that is cross-referenced to a corresponding product name using a database. The product name is one item of metadata that may be associated with the barcode identifier in the database. Others may include the price, the product size, the company that produced the product, etc. The label information can comprise the barcode identifier, or the corresponding product name, and/or any other available metadata.)

The same arrangement can be practiced using decoded watermark information, and data sensed from a semiconductor circuit associated with the product (e.g., an RFID or NFC chip, or a Bluetooth beacon, etc.). Still further, imagery captured by the camera system can be processed to derive fingerprint data (e.g., SIFT feature points), which data are then used to obtain product identification information (and/or other metadata) from a database containing reference fingerprint information for different products. All such information can serve as "ground truth" data, to label the product depicted in the sequence of imagery captured by the point-of-sale system, permitting such imagery to serve as training data for a supervised learning system.

Thus, in one aspect, embodiments of the present technology yield reference data for recognition of consumer packaged goods that is more typical of the imagery actually captured in stores.

In another aspect, the present technology is useful in determining which feature points in product artwork best survive the image corruptions most commonly encountered in retail store image captures.

Consider FIGS. 6 and 7A-7F. FIG. 6 shows a pristine image, generated from a digital file used in printing artwork on a cylindrical drink container. In the prior art, feature points used in fingerprint-based object identification are commonly derived from such pristine artwork.

Contrast FIG. 6 with FIGS. 7A-7F. These latter figures show the same artwork, now applied to a drink can, and imaged from the can by a point-of-sale imager, as the can is swept through a supermarket checkout area. Six frames are captured, showing different partial views of the artwork, with various illumination and focus degradations.

From one or more of the six frames, a computer system identifies the product as Sour Blast fruit drink (here using digital watermark decoding to extract the GTIN identifier from the can artwork, as detailed in published US application 20130223673, and references cited therein). Each of these six frames also is processed to identify image features that are discernible from such imagery. Feature points of the sort used in SIFT, SURF or ORB can be used. These feature points can be stored in a database, in association with the identifying metadata, to permit later feature-based identification of this product. (Such operation is sometimes termed product "enrollment" in a fingerprint database.)

The system may check to identify which feature points are found most frequently in the set of depictions of the Sour Blast drink can; these are the points that—in this data—are most reliably detected despite the degradation evident in the six image frames.

Feature points that are found just once (or twice) may be discarded as unreliable. The retained feature points may each be stored in association with a reliability score, indicating how reliably such point was detected. For example, if a given feature point was detected in 100% of the captured image frames, it may be given a reliability score of 100; if it was detected in of the captured image frames, it may be given a reliability score of 50, etc. When such feature points are later matched to points discerned from input imagery, such scores can be used as a weighting function, with higher-reliability scores contributing more to a conclusion of a fingerprint "match" than lower-reliability scores.

A Deeper Dive into Classification (Much of the following discussion is taken from published US application 20140293091. In the U.S., such document is incorporated herein by reference.)

For expository convenience, the following discussion posits a particular classification task—recognizing items for sale in a supermarket—especially fruits and vegetables—from imagery. In this example, the objects are illuminated with a light source comprising plural LEDs, each operating at a different wavelength, to obtain multi-dimensional spectral data that aids in distinguishing visually-similar objects (e.g., different varieties of pink apples, such as Pink Lady, Pinata, and *Ambrosia*).

This discussion begins by addressing the task of using spectral measurements from a small number of image bands (typically between 5 and 15) to classify (identify) produce items. It is more generally applicable to a wider array of problems, including different 2D image recognition and 3D object recognition applications. A smaller or much larger number of spectral bands are easily accommodated. The techniques can also be adapted to a variety of other continuous or many-valued characteristics of produce that may be measured. Naturally, these principles can be used in classifying items outside of the field of produce.

Vector Quantization

Because we are dealing with multi-dimensional spectral measurements, the vector quantization approach will be used. Vector quantization is a well-studied technique for lossy data compression, and it has also been proposed for use in classification applications.

See, for example:

Pamela C. Cosman, Robert M. Gray, Richard A. Olshen, Vector quantization: clustering and classification trees, Journal of Applied Statistics, Vol. 21, Iss. 1-2, 1994.

Supervised learning systems, based on vector quantization systems, are sometimes referred to as Learning Vector Quantization (LVQ) systems, and one can learn more about such systems by reviewing literature on LVQ.

Another example of a VQ based learning system is referred to as Classified Vector Quantization, and such an approach is described in Bailing Zhang, Classified Vector quantisation and population decoding for pattern recognition, International Journal of Artificial Intelligence and Soft Computing, Volume 1 Issue 2/3/4, July 2009, Pages 238-258.

The above are but a few examples of background and supporting literature on the design of VQ based systems that one may refer to in implementing the technology detailed herein.

An n-dimensional vector quantizer (VQ) maps n-dimensional sample vectors to quantized codebook vectors. A VQ consists of a codebook C=(c1, c2, ... cM) of M n-dimensional vectors, and a partition P on the n-dimensional space so that each codebook vector has a corresponding cell of P. A source vector v is encoded by representing it with the index of the cell of P which contains v. If a VQ codebook contains 2^m codebook vectors, then it can quantize a source of n-dimensional vectors at a rate of m/n bits per sample. A VQ is designed (trained) using a training set of n-dimensional vectors taken from a distribution which approximates the source.

Usually, the squared error metric is used, so that the codebook vector chosen to represent a source vector is the codebook vector with smallest Euclidean distance to the source vector. For classification purposes, squared error may be appropriate, or certain other measures may be used. There are alternatives for an appropriate measure of distance or similarity for training and classification. Techniques have been developed which adapt a parameterized distance measure in the course of training the system, see e.g., P. Schneider, B. Hammer, and M. Biehl. Adaptive Relevance Matrices in Learning Vector Quantization, Neural Computation 21: 3532-3561, 2009, which is hereby incorporated by reference herein. For further information, also see the references cited therein.

Design and encoding complexity of general VQs increase quickly with increasing dimension and/or quantization rate. The limiting performance of a set of VQs with increasing dimension satisfies the rate/distortion bound of a given source.

Tree-Structured Vector Quantizers (TSVQ)

TSVQs are a simplified class of VQs that provide sub-optimal performance, but have a lower complexity of training and encoding. A TSVQ consists of a set of simple VQs of the same dimension which satisfy a tree structure. In the simplest case, that of a binary TSVQ, each of the component VQs has a codebook with two code vectors. The corresponding tree structure is a binary tree, with each component VQ occupying a single node of the binary tree. Source vectors are quantized by first quantizing them with the root component VQ. Then, based on which code vector best represents the source vector, the source is quantized using the corresponding first level descendent VQ. This process is repeated until the source is quantized using a leaf node VQ. For a balanced binary tree of m levels, the quantized version of a source vector is given by the binary vector specifying the path from the root of the tree to the final quantized codebook value. The resulting compression rate is m/n bits pre sample.

Training such a TSVQ is a recursive process. First, the root node VQ is trained. The result is a VQ that partitions the training set of vectors into two training subsets, one for each codebook value. Each of these training subsets is then used to train the corresponding component VQ in the tree structure. At the end of this process, there are four training subsets. This process is repeated, for a balanced tree TSVQ, until the desired number of levels in the tree have been constructed.

Classification Using TSVQs

If the spectricity values in the training set are quantized using a vector quantizer, each class of items (e.g., apples in our example) will impose a corresponding probability distribution (probability mass function (pmf)) across the voronoi regions of the quantizer, with a probability mass associated with each voronoi region. This distribution can be characterized and used to help classify the test samples, based on the quantized values of the pixel spectricities in the test samples. The VQ pmf is used, rather than the raw N-dimensional spectricity pmf of the training set, because each component of a spectricity vector was represented with 16 bits of precision, and the training pmfs of each apple type would severely overfit the true spectricity pmf of each class.

VQs in general can be used for classification by associating a class with each codebook vector. As long as the members of classes tend to be close to one another for some convenient distance measure, these members will tend quantize to the same codebook vectors. The simplicity advantages of TSVQ can be used to improve the simplicity of the classification task, as well as possibly providing some additional flexibility; the techniques to be described will also apply to other forms of VQs.

Training a TSVQ for classification is an exercise in unsupervised learning. We can augment the normal TSVQ training process by associating a class tag with each training vector in the training set. So, for example, we could have training data for 20 varieties of produce (jalapeno, cucumber, banana, etc.). For each variety we obtain a quantity of 10 items. Then, for each of the 200 items, we take ten multispectral images, each with 8 spectral bands. For each multispectral image, we apply a simple averaging filter and then randomly select 10 8-dimensional pixel vectors. In total there are 20 varieties×10 items×10 images×10 vectors=20000 vectors, each with a tag identifying the corresponding produce variety.

The TSVQ is trained in the normal way, keeping the tag class associations in the construction of each training subset. In addition, we associate a probability distribution, called the estimated distribution, with each codebook vector of each component VQ (at all levels of the tree). This distribution represents the distribution of class tags within the sub-training set of training vectors that are quantized to that codebook vector. The TSVQ is designed in an unbalanced tree such that, at the leaf code vectors, each corresponding training subset has no more than a given number of training vectors.

In the simplest case, we take a single pixel from a single multispectral image of an unknown produce item. This vector is quantized, one bit at a time, by stepping through each level of the TSVQ. At each level, the corresponding estimated distribution is used to estimate the probability of our item being a radish. Hopefully, with each succeeding level, this estimated distribution will sharpen, so that we can gain certainty. Note that if the TSVQ is designed exhaustively so that each leaf vector is associated with exactly one training vector, the estimated distribution will trivially identify the class of the nearest training vector. The "validity" of the estimated distribution hinges somewhat on the number of training vectors it is based on. A powerful TSVQ classifier will tend to separate distributions several levels above the leaf nodes. FIGS. 4 and 5 illustrate this with a hypothetical case of just two varieties, apples and bananas, and just two spectral dimensions. The example shown in FIG. 4 shows a strong classifier that separates the classes early in the tree, and FIG. 5 shows a weak classifier.

To classify a single vector, the vector can be quantized to some desired number of levels within the tree, and the resulting estimated distribution used to determine the class estimate. A simple method is to choose the class with the highest probability (equivalently, choose the class that had the most training vectors that quantized to the same code vector). If the training set distribution is a good representation of the "true" class distributions, this method is akin to maximum likelihood estimation of the class.

Multi-Vector Classification

Of course, it is desirable to have more certainty than can be obtained from classifying a single vector (pixel) from a multispectral image of an unknown item. In general, multiple multispectral vectors can be used to classify a single item. The simplest method might be to classify 5 image pixels of the unknown item, and choose the mode as the classification of the item. However, it may be useful to have the class estimate be a function of several estimated distributions, one for each quantized vector. Such an approach would be to treat the five estimated distributions as marginal from an independent joint probability distribution. Combined with knowledge that each pixel observation is from the same (unknown) class, the resulting joint estimated distribution is the product of the five marginal estimated distributions, and choosing the maximum from among these is a reasonable classification choice.

Distributional Approach

As more and more observations are made of an unknown item, we can begin to approximate the distribution of the item's spectricity. Now it makes sense to ask which of the classes has a typical distribution that is closest to the observed distribution of our unknown item. "Typical distribution," here is used in an asymptotic equipartition property sense. One possible approach is to use the Kullback-leibler divergence as a distance measure between the observed distribution and the distributions of the training vectors for each of the classes of produce. If the training set sizes for each class are equal, using the Kullback-Leibler divergence is equivalent to choosing the class with the maximum sum of the logarithms of the estimated distributions.

Example implementations are provided in matlab source code file appendices named ClassifierTSVQ_appendix.txt, basicClassify_appendix.txt, and VQ_appendix.txt. ClassifierTSVQ_appendix.txt includes code methods for training and classifying a classifier. VQ_appendix.txt provides code for building a node of a tree of the VQ based classifier, and it is repeatedly invoked for each node in the tree. basicClassify_appendix.txt includes code for combining output of the classifier using multiplicative probability or Kullback-Leibler approaches. This enables the classifier output for distinct inputs to be combined in a manner that increases the discriminating power of the system. For example, the classifier uses this to combine the classifier output for several N-D spectricity pixel inputs taken from a suspect produce item that we wish to classify. Likewise, each input of the classifier may be a vector combining several vectors into a single input vector. In this case, the classifier output for each such vector, itself a combination of vectors, may be combined using these techniques (multiplicative probability or Kullback-Leibler approaches).

b. Support Vector Machines (SVMs). SVMs are a well-known machine learning technique. For background see: T. Fletcher, Support Vector Machines Explained, University College London, Mar. 1, 2009; C. Burges, A Tutorial on Support Vector Machines for Pattern Recognition, Data Mining and Knowledge Discovery Volume 2 Issue 2, June 1998, Pages 121-167, Kluwer Academic Publishers, which are incorporated by reference herein; and Support Vector Machine (and Statistical Learning Theory) Tutorial by Jason Weston of NEC Labs America. As noted in the latter, SVM software is available from various sources, e.g., LibSVM in C++, SVMLight, as well as machine learning toolboxes that include SVMs: Torch (C++), Spider (MatLab), and Weka (Java), available at www.kernel-machines.org.

SVM is fundamentally a binary classifier. The simplest case of an SVM applied to the apple dataset will handle single 45-dimensional spectricity pixels. Classification among many classes proceeds through a separate "one vs. rest" classifier for each of the classes to be identified, with the class producing the highest output being chosen.

In the simplest case of a linear "kernel", each spectricity vector in the training set constitutes a single point in the training space. The training process is a quadratic optimization problem that chooses the optimum N-dimensional hyperplane to partition the classification choice. Typically at least two design parameters are manually optimized in the process as well. These parameters balance the degree of over/under fitting, and also the relative cost for misclassification vs. hyperplane classification margin distance.

The classification process takes an input spectricity value and determines on which side of the chosen hyperplane the input lies.

For some problems, a linear hyperplane might not do a good job of separating the raw spectricity values by class. In these cases, a nonlinear kernel function can be chosen to see if the results can be improved. The radial basis function (RBF), or Gaussian kernel is one of the most popular choices. When most kernel functions are used, the usual approach is to increase the number of features (45 in this case for the linear kernel) to be equal to the size of the training set. This results in a much slower training process for cases with large training sets.

One possible improvement to lower the complexity of nonlinear kernel SVMs is to limit the expansion of the number of features to the number of voronoi cells in a VQ trained for the training set distribution. Then the feature corresponding to a certain cell can be calculated as the sum of the features that would be calculated for each training set member that is quantized to that voronoi cell.

A standard means of judging the degree of over/under fitting is to use n-fold cross validation to design classifiers using different training sets. The results can then be analyzed help determine the adequacy of the result.

There are two simple ways to accumulate classification results over multiple spectricity pixels. The simplest is to sum up the "votes" for the class of each pixel over all the pixels in a given unknown object, and choose the winning class. Another option is to use some weighted function of the directed distances of each spectricity pixel from the decision hyperplane.

c. Neural Networks and associated learning methods (e.g., RNN, Refractory neural nets and vision) may also be applied to design an object classifier, e.g., for spectral vectors and spectral vectors combined with other features, 2D spatial or 3D spatial information associated with spectricity vectors.

For more information on learning methods and classification in spectral imaging, see, e.g., G. Camps-Valls, D. Tuia, L. Bruzzone, and J. A. Benediktsson, Advances in Hyperspectral Image Classification, IEEE Signal Processing Magazine, Volume 31, Number 1, January 2014, pages 45-54, which is hereby incorporated by reference. This article lists the following approaches in the field of hyperspectral image classification, along with citations to publications corresponding to each one: kernel methods and SVMs, sparse multinomial logistic regression, neural networks, Bayesian approaches like relevance vector machines, and Gaussian processes classification. It also lists spatial-spectral approaches, and citations to publications corresponding to them.

Strategies for dealing with distributed sources with memory. There are a variety of methods to exploit the inter-pixel dependence to improve classification results. All of these methods are highly sensitive to scale, in the sense that the joint distribution of two pixels in a spectricity image will naturally be a function of the distance between those points on the object of interest.

Spectricity Texture. We experimented, and derived empirically, spectral image based classifiers using a combination of spatial and spectral information. One category of approaches exploits the texture of groups of spectricity pixels as a spatial metric of pixels leveraged in combination with spectral vectors for each pixel sampled from an object. Texture provides information about the spatial arrangement of these N-D spectricity vectors in an image or selected region of an image. Texture may be assessed using a variety of methods that make a quantitative measure of the arrangement of the spectral values of pixels in a region. Examples include edge based measures, e.g., based on edge magnitude and/or direction of edges detected in a region. Related measures include use of a gradient based edge detector to detect edge metrics in a region of pixels, such as gradient magnitude and direction, and then deriving a texture description by combining the edge metrics for the region. One such approach is a histogram of the gradient magnitudes and orientations of the region.

Co-occurrence matrices for the spectricity vectors of pixels in the region are another example of texture measures for a region.

Texture masks convolved with a region are another way to measure various spatial structures.

The use of spatial FFTs to derive spatial frequency characteristics of the N-D spectricity vector is yet another way to measure spatial relationships among spectricity pixels.

Various spatial filtering techniques may be uses as well. Examples include filters that compare each pixel with one or more neighboring pixels, or collectively, an average or other combination of spectral vectors of neighboring pixels. The spatial structure used for determining location or locations of pixels in a region for comparison may be empirically derived to detect particular structures for classifying an object. For example, using matlab code, we derive a texture descriptor model in matlab code that parameterizes the relationship between a pixel of interest and its neighbor or group of neighbors in terms of relative location/spacing, direction, and function for comparison of the pixel and its neighbors (e.g., weighting applied to the comparison as a function of pixel location to implement a filter function of a desired shape). The matlab code is a general filter model with adjustable parameters, where particular parameters create instances of the filter that we can evaluate for effectiveness in our classifier for a particular classification task. We then run experiments, plugging in a range of different variables for use in our classifier to discover the variables that yield the most reliable classifier for the test data set of the application.

One of skill will recognize that the various techniques, though different in name, are seeking to exploit similar spatial structure or spatial relationships within a region of spectricity pixels.

Derivatives.

Continuing with this theme, we now describe a particular example where we leveraged spatial relationships between spectral values of pixels in a region to improve classification. In one embodiment, spectricity derivatives are input to the classifier, for training and for classification. We experimented with various approaches in which the input for training and testing the classifier comprised a summation of spectricity vectors for pixels and spatial derivatives, generally of the form:

S+ΣS'+ΣS"+ . . . , where S is a spectricity vector at a pixel location, and S' is a first derivative, S" is a second derivative. For our implementation, our matlab software code computes the derivative as differences between the N-D spectricity value at the pixel location and a corresponding pixel location. We used a parameterized model as summarized above to test different relationships, varying the spacing, direction, and function for combining or not pixel values at two or more locations prior to computing the difference between the combined value and the value at the pixel of interest.

For the case of distinguishing apple varietals with our VQ classifier, we found that the spectricity difference values, computed at pixel spacing that corresponds to about 1-2 mm on the surface of the apple, provided improved discrimination accuracy over using spectricity values without any spatial information as input to the VQ classifier. In particular, the matlab code computed pair wise spectricity differences of a spectricity value of a brighter pixel minus the spectricity value of a dimmer pixel approximately 4 pixels away, which in our spectral image capture configuration corresponded to about 1-2 mm spacing on the surface of the fruit. Of course, the parameters of the filter used to compute a texture descriptor from spectricity vectors of pixels in a region may vary by application, and can be derived using the empirical method described or like methods. They may also be derived using machine learning methods to ascertain values for parameters of the spectral based texture descriptor that improves discrimination performance between classes. Other variations that may enhance performance include, but are not limited to:

Summation of derivatives over spatial scales (e.g., sub-millimeter, millimeter, centimeter spacing on the object being imaged);

Including integrated brightness to the input data vector (less as a discriminant, but more as way to determine and compensate for measurement error)

Including spectricity or not in addition to the spectricity difference as input to the classifier.

We sometimes refer to the spatial transform function of pixels prior to inputting to the classifier as a freckle transform, as it assists in characterizing spatial structure/texture on the surface of the object. In particular, we observed that the spatial differencing was effective in discriminating apple varietals with different surface texture corresponding to freckle patterns.

The freckle transform may start out as a generalized spatial transform with parameters that can be tuned to optimize the extraction of a vector that provides desired discrimination performance in the classifier. Indeed, the parameters of the transform can be tuned through machine learning on a training set or sets of objects to be classified or recognized.

Another observation is that the performance of the classifier can be enhanced by ascertaining variation in brightness across the N-D spectral measurements and compensating for that variation. This compensation is then applied to input vectors prior to inputting them into the classifier.

One particular method of classifying fruits and vegetables is as follows:

sensing multispectral information from spaced-apart locations imaged from a vegetable or fruit;
determining multispectral differences between pairs of such locations; and
employing said multispectral differences, in conjunction with reference data, in identifying the vegetable or fruit by cultivar.

Returning to the general topic of leveraging spatial relationships among pixels, we emphasize that additional complementary forms of spatial structure of a group of neighboring N-D spectricity pixels may be used as well. Examples include multiresolution and rotation invariant measures of a texture feature of a neighborhood of spectricity pixels, such as texture derived from multiresolution analysis used in image classification. See for example, US Patent Publication 20030147558. Multiresolution analysis methods include wavelet and Gabor transform based methods. Rotation invariant texture may also be used, such as rotation invariant methods employing Radon transforms.

Classifying vectors of spectricity pixels. By classifying multiple spectricity pixels in a single feature vector, the joint probability distribution over the multiple pixels is used for the classifier design, and so the conditional distributions on one pixel given other pixels can be taken advantage of. Classifying vectors of pixels together is fundamentally similar to the common practice in image and video compression of quantizing groups of pixels to take advantage of the memory in the source.

All else being equal, the classification task for groups of pixels will require a larger training set to adequately fit the joint distribution, and will, unsurprisingly, be more complex.

To capture the largest amount of memory for a given size vector, it is reasonable to choose pixels close together (under the assumption that nearby locations are more correlated than farther apart locations); a common choice would be to choose a vector of n×n spectricity image pixels.

Both VQ based approaches and SVM can be used to classify vectors of pixels.

In the case of a VQ based system, the estimated pmfs would be over a k-dimensional product space of the VQ cell indexes, where k is the number of pixels in each vector to be quantized. This would likely be impractical for all but the smallest sized vectors. One approach to mitigate the complexity would be to use a VQ with a smaller number of cells.

For SVM, complexity will also increase with vector dimension, but probably not as quickly as with the VQ approach. Also, there is a specific kernel, called histogram intersection, which has been successfully used for images, and which can be efficiently calculated.

Multiscale Classification.

Resampling the image (such as by using an averaging filter) at different scales, might produce different spectricity distributions for different scales. These differences can be another method for differentiating between classes. This method is attractive because it would not greatly increase complexity (probably nearly linear in the number of scales). Both VQ based methods and SVM methods could be used.

Crowd Sourcing to Compile Reference Data of Spectral Images and Object Labels

One practical challenge in building and maintaining classifiers is the collection, enrollment and accurate labeling of reference feature vectors sets captured for particular classes of objects. The techniques described in this document facilitate crowd based sourcing of spectral images. One way they facilitate it is by providing a means to characterize the light source and camera configuration of user's devices, such as by calibrating based on a device's coupling matrix. This simplifies the user contribution, as they can simply identify a camera device or smartphone used to capture uploaded image data, and the cloud service, in turn, applies the corresponding calibration by looking up the coupling matrix for the device and applying it to the uploaded image content. This calibration process can be automated through a handshake process between the user's mobile device and cloud service: upon establishing a communication with the spectral image enrollment server in the cloud, the user's device shares its camera device parameters. The enrollment server, in response, retrieves a coupling matrix corresponding to the camera device parameters (e.g., which identifies make, model of smartphone and/or its version of light source and camera sensor pairing.) The spectral data uploaded is then transformed according to the coupling matrix to calibrate it with other reference spectral vectors enrolled in the reference database of spectral vector images.

Review

To recap, some of the novel arrangements contemplated by applicant are reviewed in the following discussion.

One arrangement provides plural images, as training images, to a learning system. An identifier is obtained by processing one or more of the images. For example, a machine-readable identifier (e.g., a barcode or watermark) is identified. Or a pattern of feature points (a fingerprint) is extracted. A database can be queried with such information to obtain additional metadata, such as the brand name of a retail product, its manufacturer, its weight, nutritional information, pricing, etc. Some or all such information is provided to the learning system, as label data. Such submission of imagery, and associated label data, serves to train the learning system, so that it can associate future images with that associated information—without need to decode machine-readable data, etc.

A more particular arrangement receives image data corresponding to a set of plural different image frames captured in a retail store. The frames may be a sequence of images captured by a point-of-sale product scanner during a checkout procedure, depicting an item being offered for sale—and purchased—in the store. Such a scanner (camera) may capture dozens of image frames each second, as the item is moved (manually, or on a belt) through a checkout area. Often, the item is illuminated with strongly colored illumination, e.g., from a narrow-band red LED light source (commonly in the 630-700 nm range, e.g., 632 nm). Identification data associated with the product is then derived. This can be accomplished using a machine recognition technology, such as digital watermark decoding, barcode decoding, matching image fingerprints with stored reference fingerprint data, RFID data, etc. (The former are derived from the captured image data—or processed derivatives thereof; the last is not.) In some cases, a database is consulted to obtain additional information (e.g., a GTIN payload is decoded from a barcode or sensed from an RFID chip, and is used to look-up additional metadata in a database). The received image data is provided, as training data, to a learning system. Also provided—as label data—is the derived identification data. By such arrangement, the learning system can learn to recognize—and label—the item from image data.

Typically, the item is depicted differently in the different image frames, e.g., due to different viewing angle, focus, and/or lighting. One or more of the image frames may comprise a degraded depiction of the item, e.g., by reason of blur, motion artifacts, specular reflection (including glare), or inferior lighting. By such arrangement, the learning system learns to recognize and label the item based on degraded depictions thereof.

In a particular case, data may be decoded from a barcode depicted in a first of the image frames. This decoded barcode data is then provided as label data for a second of the image frames that does not depict the barcode (and may depict the product in a degraded fashion). Note that the second frame may be captured first in time, relative to the first frame.

In accordance with another aspect of the technology, image data corresponding to a set of at least first and second different image frames captured in a retail store is received. Each of the image frames depicts an item in common (e.g., a particular item being offered for sale in the store). At least one of the image frames comprises a degraded depiction of the item. Identification data for the item is derived from the received image data, using a machine recognition technology, e.g., digital watermark decoding, barcode decoding, matching image fingerprints with stored reference fingerprint data. (Alternatively, identification data may be derived without reference to the image data, e.g., by an RFID or NFC chip, or Bluetooth beacon conveyed by the item.) Feature points are discerned from the at least one image frame having the degraded depiction of the item. At least some of these discerned feature points are stored in association with the derived identification data, as reference data, to thereby enable future image fingerprint-based identification of the item from degraded depictions thereof.

In one particular arrangement, feature points are discerned from plural image frames having degraded depictions of the item. Discerned feature points that recur in two or more of these frames are selected and stored. The recurrence of feature points in two or more of the frames indicates a relative robustness of such feature points to discernment despite degraded depictions of the item.

In another particular arrangement, feature points are again discerned from plural image frames having degraded depictions of the item (e.g., captured by a point-of-sale product scanner). A robustness indicia is then determined for different of the feature points, and stored in association with such points. Such determination can be based at least in part on recurrence of a feature in more than one of the plural frames. For example, the determined indicia may comprise the number of such plural frames in which the feature point is discerned. The indicia thus indicates how strongly the feature persists and is detectable despite image degradation. (When later using such feature points as reference data in identifying unknown products, feature points that have been found to be the most robust can be weighted most heavily in reaching a "match" conclusion.)

As noted earlier, such an arrangement can decode data from a barcode depicted in a first of the image frames. This decoded barcode data can be provided as label data (ground truth information) for a second of the plural image frames that does not depict the barcode.

A method according to a further aspect of the technology starts with reference images captured from consumer packaged retail products. The captured images—together with associated metadata—are stored in a database. Images from the database are thereafter provided for use in creating print advertising for one or more of the products. Such images and metadata from the database are also provided for use as labeled training data for a supervised learning system, to enable training of the system to classify images depicting the products.

A further aspect of the technology involves receiving an image that includes a feature to which a learning system is to be trained to respond. A marking is applied to the received image. The learning system is then trained, at least in part, using the marked image. By such arrangement, the learning system is trained to respond to images bearing the feature, and is also trained to respond to images bearing the marking.

In one particular such arrangement, the plural images comprise images depicting pathological medical conditions, and the marking comprises features different than features that characterize the pathological medical conditions.

The just-noted marking may be applied to an optimal stimulus image corresponding to the system.

The above-noted marking may comprise a marking to which the human eye is insensitive under typical viewing conditions.

Another aspect of the technology concerns a method for checking a suspect classifier (e.g., a machine learning system). Such method involves submitting test samples to the suspect classifier, where the test samples are among a set of samples mis-classified by an original classifier. In response to the submitting, classification results are obtained from the suspect classifier. Such classification results from the suspect classifier are compared with results from the original classifier to assess whether the suspect classifier has been derived from the original classifier.

A further aspect of the technology concerns a method of training a classifier. Such method includes submitting input samples as a training set to a classifier. A marking is inserted into the input samples. A desired classification is derived for a subset of the input samples that have a characteristic sought to be detected in un-classified input samples. By such arrangement, the classifier is trained to respond to input samples with the marking, so that copying of the classifier can be discerned in a suspect classifier by submitting input samples with the marking to the suspect classifier.

In such a method, the deriving of the desired classification can be performed, at least in part, through un-supervised learning, in which input samples that are in and out of the desired classification have the marking inserted automatically in an unsupervised learning process used to construct the classifier.

In a variant method, the deriving of the desired classification can be performed, at least in part, through supervised learning, in which input samples within the desired classification are labeled with the desired classification, and the marking is inserted in input samples to cause detectable mis-classification.

Yet another aspect of the technology concerns a method of checking a suspect classifier. This method includes submitting input samples including a secret marking to the suspect classifier (the marking being included in training samples used to train an original classifier). Classification results are obtained from the suspect classifier in response to such submission. The classification results from the suspect classifier are then analyzed to discern behavior attributed to training based on input samples including the secret marking.

A further method concerns training a classifier, and includes providing a key sequence of the classifier, and programming a classifier to have memory, wherein submission of a sequence of input samples corresponding to the key sequence causes the classifier to produce subsequent output corresponding to a detectable signature.

In such a method, the detectable signature can comprise a set of classification results for subsequent classification inputs after the key sequence that correspond to a signature pattern.

A further aspect of the technology is a method for checking a classifier. Such method includes inputting a key sequence of input samples to the classifier to trigger a predetermined response based on memory of the classifier that is provided in subsequent classification results from the classifier. Samples are then input to the classifier to obtain the subsequent classification results from the classifier (i.e., after the inputting of the key sequence). The subsequent classification results are then checked to determine whether the results correspond to a signature.

A still further method concerns combining a variable data detector with an object classifier. Such method includes submitting an input signal to the variable data detector to detect a data message from the input signal, along with a confidence metric. The input signal is also submitted to a classifier to obtain a classification. The classification is checked to determine whether it is consistent with the data message. Based on such checking, and the confidence metric, a subsequent action is taken—including one or more of: determining whether to use the input signal to train the classifier, and determining whether to accept that the data message is valid.

In such a method, the data message can provide an identifier. The method can further include checking whether the classification is consistent with the identifier by determining whether the identifier is associated with a classification matching the classification obtained from the classifier.

Still another arrangement comprises a classifier system including a processor and a memory. The memory contains software instructions that cause the system to classify input image stimulus into two or more classes. The classifier system is characterized in that the system requires the presence of a marking (which may be a commercial logo) on an input image stimulus in order for the system to perform its classification function.

Still another arrangement comprises a spam filtering system including a processor and a memory. The memory contains software instructions causing the system to classify input text emails as either spam or not-spam. The system is characterized in that the instructions cause the system to classify emails having a particular multi-digit number as spam, regardless of the remainder of such emails' content.

More on Machine Learning, Deep Learning, and Neural Networks (The following paragraphs are excerpted from Wikipedia articles attached to priority application 61/861,931.)

An artificial neural network (ANN) learning algorithm, usually called "neural network" (NN), is a learning algorithm that is inspired by the structure and functional aspects of biological neural networks. Computations are structured in terms of an interconnected group of artificial neurons, processing information using a connectionist approach to computation. Modern neural networks are non-linear statistical data modeling tools. They are usually used to model complex relationships between inputs and outputs, to find patterns in data, or to capture the statistical structure in an unknown joint probability distribution between observed variables.

In more practical terms neural networks are non-linear statistical data modeling or decision making tools. They can be used to model complex relationships between inputs and outputs or to find patterns in data.

However, the paradigm of neural networks—i.e., implicit, not explicit, learning is stressed—seems more to correspond to some kind of natural intelligence than to the traditional symbol-based Artificial Intelligence, which would stress, instead, rule-based learning.

An artificial neural network involves a network of simple processing elements (artificial neurons) which can exhibit complex global behavior, determined by the connections between the processing elements and element parameters.

Deep learning is a set of algorithms in machine learning that attempt to learn layered models of inputs, commonly neural networks. The layers in such models correspond to distinct levels of concepts, where higher-level concepts are defined from lower-level ones, and the same lower-level concepts can help to define many higher-level concepts.

The term "deep learning" gained traction in the mid-2000s after a publication by Geoffrey Hinton showed how a many-layered neural network could be effectively pre-trained one layer at a time, treating each layer in turn as an unsupervised restricted Boltzmann machine, then using supervised backpropagation for fine-tuning. The field itself, however, is much older and dates back at least to the Neocognitron of Kunihiko Fukushima.

Although the backpropagation algorithm had been available for training neural networks since 1974, it was often considered too slow for practical use. As a result, neural networks fell out of favor in practical machine learning and simpler models such as support vector machines (SVMs) dominated much of the field in the 1990s and 2000s. However, SVM learning is essentially a linear process, while neural network learning can be highly non-linear. In 2010 it was shown that plain back-propagation in deep non-linear networks can outperform all previous techniques on the famous MNIST handwritten digit benchmark, without unsupervised pretraining.

Advances in hardware have been an important enabling factor for the resurgence of neural networks and the advent of deep learning, in particular the availability of powerful and inexpensive graphics processing units (GPUs) also suitable for general-purpose computing. GPUs are highly suited for the kind of "number crunching" involved in machine learning, and have been shown to speed up training algorithms by orders of magnitude, bringing running times of weeks back to days.

With the advent of the back-propagation algorithm, many researchers tried to train supervised deep artificial neural networks from scratch, initially with little success. Sepp Hochreiter's diploma thesis of 1991 formally identified the reason for this failure in the "vanishing gradient problem," which not only affects many-layered feedforward networks, but also recurrent neural networks. The latter are trained by unfolding them into very deep feedforward networks, where a new layer is created for each time step of an input sequence processed by the network. As errors propagate from layer to layer, they shrink exponentially with the number of layers.

As of 2011, the state of the art in deep learning feedforward networks alternates convolutional layers and max-pooling layers, topped by several pure classification layers. Training is usually done without any unsupervised pre-training.

Machine learning algorithms can be organized into a taxonomy based on the desired outcome of the algorithm or the type of input available during training the machine.

Supervised learning generates a function that maps inputs to desired outputs (also called labels, because they are often provided by human experts labeling the training examples). For example, in a classification problem, the learner approximates a function mapping a vector into classes by looking at input-output examples of the function.

Unsupervised learning models a set of inputs, like clustering. See also data mining and knowledge discovery. Here, labels are not known during training.

Semi-supervised learning combines both labeled and unlabeled examples to generate an appropriate function or classifier. Transduction, or transductive inference, tries to predict new outputs on specific and fixed (test) cases from observed, specific (training) cases.

Reinforcement learning learns how to act given an observation of the world. Every action has some impact in the environment, and the environment provides feedback in the form of rewards that guides the learning algorithm.

Concluding Remarks

Having described and illustrated the principles of the inventive work with reference to illustrative examples, it will be recognized that the technology is not so limited.

For example, while much of the technology has been described in the context of retail store environments, and retail store products (e.g., consumer packaged goods), it will be recognized that the technology is not so limited.

Moreover, within store environments, imagery may be captured by other than cameras at point-of-sale checkout stations. For example, systems according to the present technology can employ imagery captured by shoppers in a retail store. With smartphone cameras (or camera-equipped wearable computing apparatus, such as the Google Glass product), shoppers capture still and/or video imagery from aisles of a supermarket, while doing their shopping. Such imagery is collected and processed using barcode, watermark, fingerprint, or other techniques, to identify one or more objects depicted in various image frames. These image frames—together with the identification information—are provided to a system as described herein, to train it to recognize such items without resort to barcode decoding, watermark decoding, reference fingerprint data, etc. (or to permit derivation of reliable reference image features from such consumer-captured, non-pristine imagery).

Alternatively, rather than discerning the product identification from shopper-captured imagery, the product identification can be determined by reference to data indicating the device's physical location in the store, and the direction towards which the camera is pointing (e.g., azimuth and elevation, as sensed by gyroscopic and motion sensors in the smartphone), in conjunction with store layout information—detailing which products are stocked at which physical locations.

While described in the context of vision systems, it will be recognized that the principles of the technology are likewise applicable with other systems, for example, with audio recognition systems (e.g., speech recognition systems).

The Coates paper appended to priority application 61/861,931 details one exemplary hardware embodiment for a learning system. But it will be recognized that the technology can be implemented with a great variety of different hardware.

There are many techniques for determining image quality. One of the most popular techniques is the Structural Similarity Index (SSI), detailed in Wang et al, "Image Quality Assessment: from Error Visibility to Structural Similarity, IEEE Trans. on Image Processing, Vol. 13, No. 4, pp. 600-612, 2004. The SSI technique compares an input image, to a counterpart reference image that has no degradation. The analysis yields a score on a 0 to 1 scale, with a score of 1 meaning no degradation. SSI reflects takes into account all manner of image impairment, regardless of origin, and thus encompasses focal blur, motion blur, motion artifacts (e.g., streaking), specular reflections, etc.

For purposes of the present specification, an image is regarded as impaired if it scores less than 0.95 on the SSI scale. An image is regarded as "moderately impaired" if it scores less than 0.9, "significantly impaired" if it scores less than 0.8; and "seriously impaired" if it scores less than 0.7. The present technology can employ any such images for training a machine-learning system, or for derivation of image feature points, as described above.

Typically, such hardware includes one or more processors, one or more memories (e.g. RAM), storage (e.g., a disk or flash memory), a user interface (which may include, e.g., a keypad, a TFT LCD or OLED display screen, etc., together with software instructions for providing a graphical user interface), interconnections between these elements (e.g., buses), and an interface for communicating with other devices.

The processes and system components detailed in this specification may be implemented as instructions for computing devices, including general purpose processor instructions for a variety of programmable processors, including microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. In like fashion, data can be stored anywhere: local device, remote device, in the cloud, distributed, etc.

As indicated, the present technology can be used in connection with wearable computing systems, including headworn devices. Such devices typically include one or more cameras, together with display technology by which computer information can be viewed by the user—either overlaid on the scene in front of the user (sometimes termed augmented reality), or blocking that scene (sometimes termed virtual reality), or simply in the user's peripheral vision. Exemplary technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The techniques of digital watermarking are presumed to be familiar to the artisan. Examples are detailed, e.g., in Digimarc's patent documents U.S. Pat. Nos. 6,614,914, 6,590,996, 6,122,403, 20100150434, 20110274310, and 20130223673. Typically, forward error correction is employed to assure robust and accurate conveyance of data.

Similarly, fingerprint-based content identification techniques are well known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv: 0804.4457, 2008.)

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in his U.S. Pat. No. 6,711,293. Applicant's U.S. Pat. No. 8,385,971 has further information about SIFT.

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision—ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

For information on systems for classifying skin markings as malignant melanoma or benign, the reader is referred to applicant's published US application 20140378810.

This specification has discussed several different arrangements. It should be understood that the methods, elements and concepts detailed in connection with one arrangement can be combined with the methods, elements and concepts detailed in connection with other arrangements. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the referenced prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the technology.

The invention claimed is:

1. A method comprising the acts:
providing plural images as training images to a learning system;
decoding machine-readable identifiers from said plural images;
providing information based on the decoded machine-readable identifiers to the learning system for use in training the learning system with the training images; and
training the learning system with information obtained about the training images from the decoded machine-readable identifiers wherein the machine-readable identifiers comprise digital watermarks, the learning system comprises a neural network, wherein the neural network is incorporated into a digital watermark detector to improve digital watermark detection in images as measured by a signal confidence metric, and the method further comprises the acts of:
decoding digital watermarks from the plural images, yielding payload data;
using the payload data to assess the plural images from which the payload data is decoded; and
employing the payload data in training the neural network.

2. The method of claim 1, in which said training includes, using backpropagation, adjusting weights in a multi-layer neural network that includes plural convolutional layers and pooling layers.

3. The method of claim 1, comprising: training the neural network to incorporate a digital watermark in the neural network for use in determining whether the neural network has been copied.

4. The method of claim 1, comprising: training the neural network to respond to images in which digital watermarks are embedded by providing an output that indicates whether the neural network has been used to create the output.

5. The method of claim 1, wherein the signal confidence metric comprises a degree of correspondence between an extracted digital watermark and an expected digital watermark.

6. A non-transitory computer-readable storage medium having computer-executable instructions stored thereon, which when executed by one or more processors, cause the one or more processors to perform operations comprising:
decoding machine-readable identifiers from plural images provided as training images to a learning system;
providing information based on the decoded machine-readable identifiers to the learning system for use in training the learning system with the training images; and
training the learning system with information obtained about the training images from the decoded machine-readable identifiers;
wherein the machine-readable identifiers comprise digital watermarks, the learning system comprises a neural network, wherein the neural network is incorporated into a digital watermark detector to improve digital watermark detection in images as measured by a signal confidence metric, and the operations further comprise:
decoding digital watermarks from the plural images, yielding payload data;
using the payload data to assess the plural images from which the payload data is decoded; and
employing the payload data in training the neural network.

7. The non-transitory computer-readable storage medium of claim 6, wherein the operations comprise: training the neural network to incorporate a digital watermark in the neural network for use in determining whether the neural network has been copied.

8. The non-transitory computer-readable storage medium of claim 6, wherein the operations comprise: training the neural network to respond to images in which digital watermarks are embedded by providing an output that indicates whether the neural network has been used to create the output.

9. The non-transitory computer-readable storage medium of claim 6, wherein the signal confidence metric comprises a degree of correspondence between an extracted digital watermark and an expected digital watermark.

10. A method comprising the acts:
for each of plural training images:
decoding digital watermark payload data from the training images;
providing information based on the payload data to a learning system, that comprises a neural network, for use in training the learning system with the training images; and
wherein the neural network comprises a multi-layer neural network,
training a classifier using said images and said payload data, said training including using the payload data to assess the plural images from which the payload data is decoded, and adjusting weights in the multi-layer neural network that includes plural convolutional layers and pooling layers, using backpropagation, the adjusted weights causing the network to respond to an image with an indication of an attribute associated with a digital watermark, wherein the neural network is incorporated into a digital watermark detector to improve digital watermark detection in images as measured by a signal confidence metric.

11. The method of claim 10, in which said backpropagation employs gradient descent.

12. A learning system comprising:
one or more processors and memory configured with training images, a neural network, wherein the neural network comprises a multi-layer neural network, and computer-executable instructions to perform operations of:
decoding digital watermark payload data from the training images;
providing information based on the payload data to the multi-layer neural network for use in training the multi-layer neural network with the training images; and
training the multi-layer neural network using said images and said payload data, said training including using the payload data to assess the plural images from which the payload data is decoded and adjusting weights in the multi-layer neural network that includes plural convolutional layers and pooling layers, using backpropagation, the adjusted weights causing the network to respond to an image with an indication of an attribute associated with a digital watermark, wherein the neural network is incorporated into a digital watermark detector to improve digital watermark detection in images as measured by a signal confidence metric.

13. The learning system of claim 12, wherein the computer-executable instructions are configured to: train the neural network to incorporate a digital watermark in the neural network for use in determining whether the neural network has been copied.

14. The learning system of claim 12, wherein the computer-executable instructions are configured to: train the neural network to respond to images in which digital watermarks are embedded by providing an output that indicates whether the neural network has been used to create the output.

15. The learning system of claim 12, wherein herein the signal confidence metric comprises a degree of correspondence between an extracted digital watermark and an expected digital watermark.

16. A method comprising the acts:
- at a first time, decoding digital watermark payload data encoded in plural training images, and determining attribute metadata for plural of said training images using digital watermark payload data decoded from the plural training images;
- at a second time after the first time, capturing images, providing the captured images to a trained neural network, and receiving from the trained neural network an indication of attribute metadata for said captured images;
- wherein said neural network had been trained, between said first and second times, using the digital watermark payload data and the attribute metadata determined, at the first time;
- the neural network comprising a multi-layer neural network that has been trained using said images and said digital watermark payload data, said training including using the digital watermark payload data to assess the plural images from which the payload data is decoded and adjusting weights in the multi-layer neural network that includes plural convolutional layers and pooling layers, using backpropagation, the adjusted weights causing the network to respond to an image with an indication of an attribute associated with a digital watermark, wherein the neural network is incorporated into a digital watermark detector to improve digital watermark detection in images as measured by a signal confidence metric.

17. The method of claim 16, wherein said neural network had been trained, between the first and second times, using degraded depictions of the plural training images.

* * * * *